US008812394B1

(12) United States Patent  (10) Patent No.: US 8,812,394 B1
Folk et al.  (45) Date of Patent: Aug. 19, 2014

(54) PROCESS AND DATA INTEGRATION OF ADDITIONAL FUNDS INTO CASH HANDLING DEVICE AND RECONCILIATION

(75) Inventors: Amy Baker Folk, Charlotte, NC (US); Daniel Christopher Bohen, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 891 days.

(21) Appl. No.: 12/368,563

(22) Filed: Feb. 10, 2009

Related U.S. Application Data

(60) Provisional application No. 61/113,139, filed on Nov. 10, 2008.

(51) Int. Cl.
*G06Q 40/00* (2012.01)
*G06Q 20/10* (2012.01)
*G07D 7/00* (2006.01)
*G07F 19/00* (2006.01)

(52) U.S. Cl.
CPC ............ *G06Q 20/10* (2013.01); *G07D 7/00* (2013.01); *G07F 19/00* (2013.01); *G06Q 40/00* (2013.01)
USPC .......................................... 705/39; 235/379

(58) Field of Classification Search
CPC ....... G06Q 20/10; G06Q 20/12; G06Q 40/00; G07F 19/00; G07D 7/00
USPC ........................................... 705/39; 235/379
See application file for complete search history.

(56) References Cited

U.S. PATENT DOCUMENTS

| 4,106,667 | A | * | 8/1978 | Lynott ............................. 221/1 |
| 4,150,740 | A | * | 4/1979 | Douno ........................ 194/206 |
| 4,760,923 | A | * | 8/1988 | Lundblad et al. ............. 209/534 |
| 5,553,320 | A | * | 9/1996 | Matsuura et al. ............. 235/379 |
| 5,555,983 | A | * | 9/1996 | Yamagishi .................... 209/534 |
| 5,606,157 | A | * | 2/1997 | Awatsu et al. ................ 235/379 |
| 6,164,638 | A | * | 12/2000 | Owens et al. .................... 271/34 |
| 6,170,818 | B1 | * | 1/2001 | Eastman et al. ............. 271/184 |
| 6,290,070 | B1 | * | 9/2001 | Graef et al. .................... 209/534 |
| 6,824,047 | B2 | | 11/2004 | Katou et al. |
| 6,983,836 | B2 | * | 1/2006 | Adams et al. ................. 194/302 |
| 7,000,778 | B2 | | 2/2006 | Omori et al. |
| 7,066,335 | B2 | * | 6/2006 | Aas et al. ...................... 209/534 |
| 7,219,083 | B2 | * | 5/2007 | Bellucci et al. ................. 705/43 |
| 8,019,663 | B1 | * | 9/2011 | Bohen et al. .................... 705/30 |
| 2001/0054643 | A1 | * | 12/2001 | Siemens ....................... 235/379 |
| 2002/0107800 | A1 | * | 8/2002 | Kadowaki et al. ............. 705/43 |
| 2002/0198839 | A1 | * | 12/2002 | Uozumi et al. ................. 705/45 |
| 2004/0064413 | A1 | * | 4/2004 | Mtzig et al. .................... 705/42 |
| 2004/0213620 | A1 | * | 10/2004 | Bergeron et al. ............. 400/668 |

(Continued)

*Primary Examiner* — Kirsten Apple
*Assistant Examiner* — Joan Goodbody
(74) *Attorney, Agent, or Firm* — Banner & Witcoff, Ltd.; Michael A. Springs

(57) ABSTRACT

A cash recycler or other currency handling device includes a flexible capacity module for adding additional storage capacity to the cash handling device. In some arrangements, all bills of one denomination, i.e., all one dollar bills, may be stored in, deposited into, and/or dispensed from the flexible capacity module. The bills stored in the flexible capacity module may not be debited or credited to a client account at a financial institution because the bills may not be considered part of the inventory of the cash handling device. However count data for the bills in the flexible capacity module may be integrated with data from the cash handling device in order to facilitate balancing, reconciliation, and the like.

8 Claims, 11 Drawing Sheets

(56) References Cited

U.S. PATENT DOCUMENTS

| | | | |
|---|---|---|---|
| 2005/0187876 A1* | 8/2005 | Gessler | 705/42 |
| 2005/0263582 A1* | 12/2005 | Yokoi et al. | 235/379 |
| 2007/0108267 A1* | 5/2007 | Jonsson et al. | 235/379 |
| 2008/0038038 A1* | 2/2008 | Arai et al. | 400/582 |
| 2009/0057093 A1* | 3/2009 | Iwami et al. | 194/206 |
| 2009/0229949 A1* | 9/2009 | Nakamoto | 194/302 |
| 2009/0229950 A1* | 9/2009 | Nakamoto | 194/302 |
| 2009/0319080 A1* | 12/2009 | Utsumi et al. | 700/231 |
| 2010/0125515 A1* | 5/2010 | Aso et al. | 705/35 |
| 2011/0154742 A1* | 6/2011 | Nunn | 49/506 |

* cited by examiner

RECONCILIATION REPORT

| REGISTER | STATUS | DATE CLOSED | RUNNING BALANCE | RECYCLER ACTIVITY | REJECTED NOTES | COIN ACTIVITY | OTHER ACTIVITY |
|---|---|---|---|---|---|---|---|
| AAA | CLOSED | 1/1/2008 | $764 | $662 | $7 | $(5) | $100 |
| BBB | CLOSED | 1/1/2008 | $764 | $662 | $7 | $(5) | $100 |
| CCC | OPEN | 1/1/2008 | $(50) | $(80) | - | $(20) | $50 |
| DDD | OPEN | 1/1/2008 | $(50) | $(80) | - | $(20) | $50 |
| EEE | OPEN | 1/1/2008 | $(50) | $(80) | - | $(20) | $50 |
| RESERVE | OPEN | 1/1/2008 | $(50) | $(80) | - | $(20) | $50 |

PRINT    BACK

FIG. 7

PROCESS AND DATA INTEGRATION OF ADDITIONAL FUNDS INTO CASH HANDLING DEVICE AND RECONCILIATION

CROSS-REFERENCE TO RELATED APPLICATIONS

This application claims priority to U.S. Provisional Application No. 61/113,139, entitled "Process and Data Integration of Additional Funds Into Cash Handling Device and Reconciliation," and filed Nov. 10, 2008, which is incorporated herein by reference in its entirety.

BACKGROUND

Cash flow refers to the movement of cash over a particular time period within a business or enterprise. The calculation of cash flow may be used as one measure to gauge financial health of the business. Managers in charge of cash flow management may use various tools to assist in making decisions involving cash flow including cash recyclers which allow a retail establishment to maintain and re-use an amount of currency on-site. The cash recycler may further calculate and manage use of cash flows in real-time.

Cash handling devices, such as cash recyclers, are being used in more locations, i.e., retails stores, and the like. Many of these retail stores often output more of one denomination of bills than they take in. For instance, retail stores often give out more one dollar bills than they take in. Because the cash handling device is limited in capacity by the size of the device, the number of one dollar bills able to be stored in the cash handling device is limited. Additional capacity may be added via an additional cash handling device. However, cash handling devices are expensive and can take up considerable space. Additional funds may also be stored outside the cash handling device. However, this may result in a loss of data because the information associated with those funds is not transmitted to the cash handling device and may complicate automated balancing and reconciliation because it may require manual counting of the bills. Accordingly, there is a need for additional flexible capacity for a cash handling device.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

Aspects of this invention relate to a flexible capacity module that may be connected to a cash handling device. In some arrangements, all bills of one denomination, such as all one dollar bills, may be stored in, deposited into, and/or dispensed from the flexible capacity module. The data relating to the count, and the like of bills in the flexible capacity module may be separate from the count data for bills stored in the cash handling device. However, the data will be integrated for purposes of balancing, reconciling a cash drawer or till, and the like.

BRIEF DESCRIPTION OF THE DRAWINGS

The present disclosure is illustrated by way of example and not limited in the accompanying figures in which like reference numerals indicate similar elements.

FIG. 7 is an example user interface for reconciling cash, including currency and coin, from a cash handling device and flexible capacity module in accordance with aspects described herein.

The reader is advised that the attached drawings are not necessarily drawn to scale.

DETAILED DESCRIPTION

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), currency recyclers, deposit and dispensing machines, and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

Figure 1:
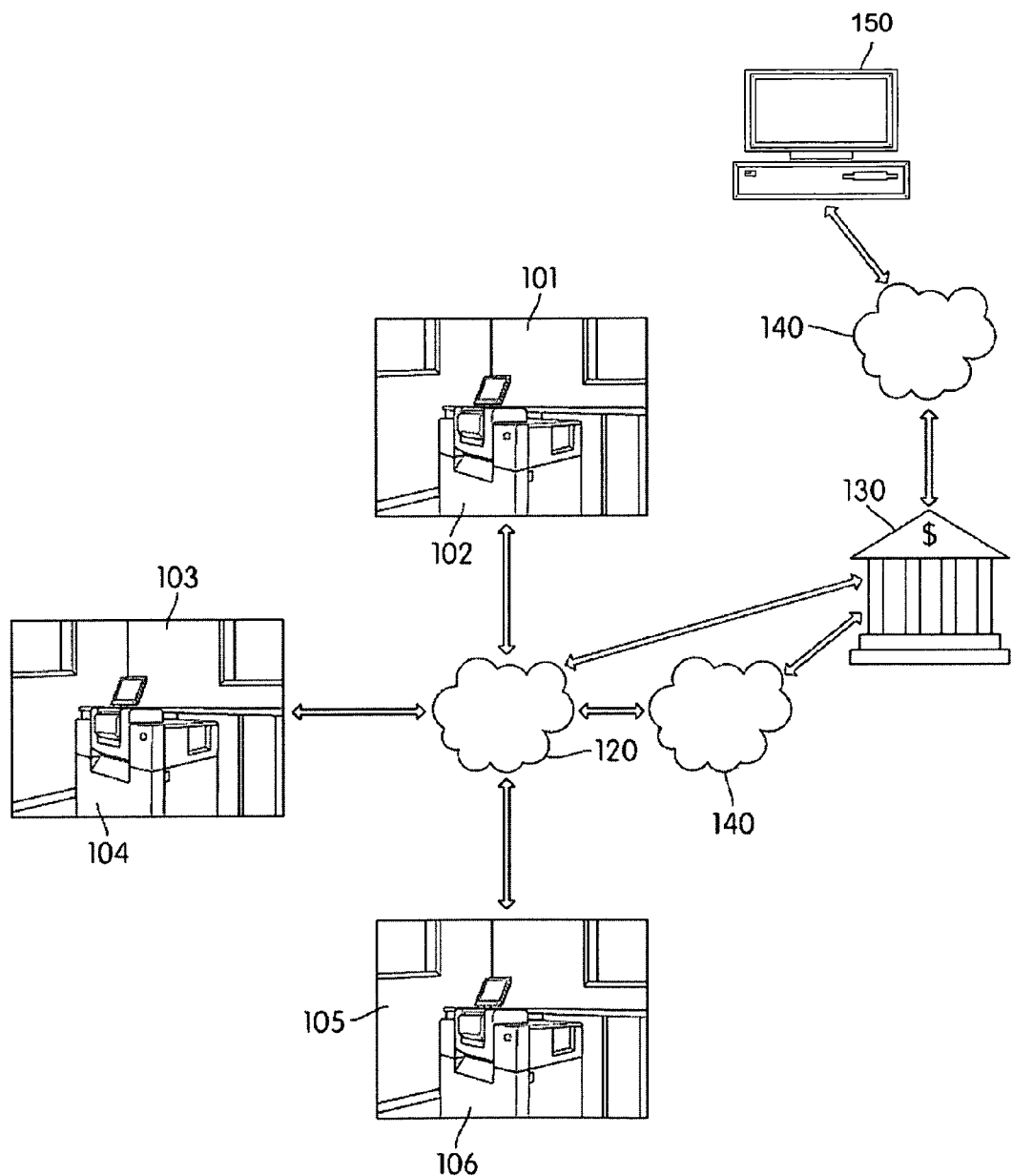
FIG. 1 illustrates an example of a suitable operating environment in which various aspects of the disclosure may be implemented.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located.

For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 before being connected to bank 130. According to one or more arrangements, bank 130 may utilize an infrastructure which includes a server 150 having components such as a memory, a processor, a display, and a communication interface.

Figure 2:
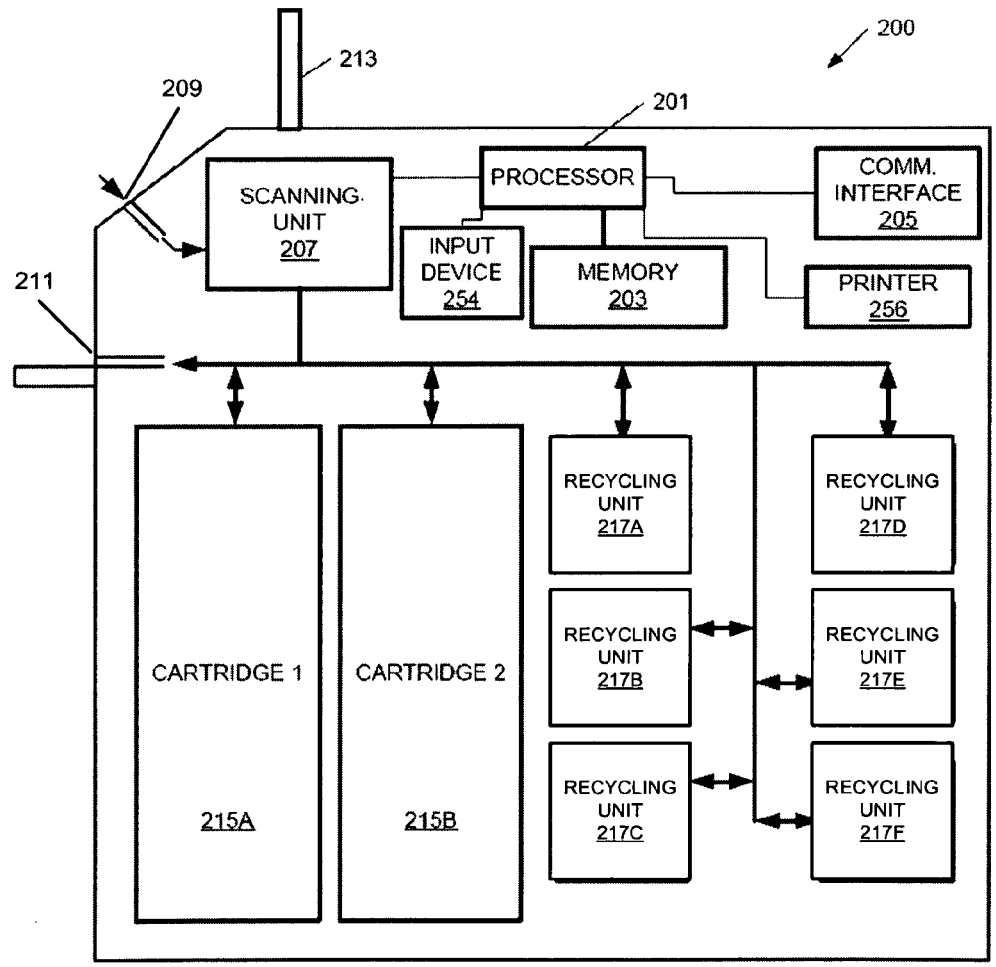
FIG. 2 illustrates a simplified diagram of a currency recycler in accordance with an aspect of the invention.

FIG. 2 illustrates a simplified diagram of a cash recycler that may be used in accordance with the operating environment of FIG. 1. Cash recycler 200 may include processor 201, memory 203, communication interface 205, scanning unit 207, display 213 and various cartridges 215 and recycling units 217. Processor 201 may be generally configured to execute computer-readable instructions stored in memory 203 such that, for example, cash recycler 200 may send and receive information to and from a bank (e.g., bank 130 of FIG. 1) using communication interface 205 and via a network (e.g., networks 120 and/or 140 of FIG. 1). Memory 203 may be configured to store a variety of information including the aforementioned computer-readable instructions, funds balance data, reconciliation data, user account information and the like. Additionally, memory 203 may include non-volatile and/or volatile memory. One or more databases may be stored in the memories 108, 112, and 116.

Cash recycler 200 may further provide display 213 to present data and/or messages to a user. For example, display 213 may be configured to display a recycler balance, a transaction interface, a current deposit count, security options, transportation options and the like. One or more input devices 254 such as a keypad, keyboard, mouse, touchscreen, fingerprint scanner, retinal scanner, proximity card reader, RFID scanner and/or writer, magnetic card reader, barcode reader, and/or combinations thereof, or any other type of input device or reader capable of inputting, reading, or scanning indicia or information, may also be included in or connected to recycler 200. One or printers 256 may also be included in or connected to recycler 200 for printing receipts and notifications as well.

In cash recycler 200, recycling units 217 and cartridges 215 are configured to store currency. Currency may be inserted through input slot 209 and withdrawn through withdrawal slot 211. Recycling units 217, including stackers, rolled storage modules, and the like, may be used to store and organize currency based on denomination. For example, all $5 bills may be stored in recycling unit 2 (i.e., recycling unit 217B) while all $20 bills may be stored in recycling unit 3 (i.e., recycling unit 217C). Cartridges 215A and 215B, on the other hand, may be used to store overflow currency and/or currency for transport. Thus, if recycling units 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and recycling units 217 may further be removable for easier access or transport.

Scanning unit 207 may be configured to scan each bill or currency that is inserted into recycler 200. Scanning unit 207 may be configured to detect defects, unauthorized reproductions, denomination, type of currency (e.g., which country the currency originates from) and the like. Scanning unit 207 may further be configured to refuse money (either through input slot 209 or withdrawal slot 211) if it cannot be properly recognized or if the currency is deemed to be an unauthorized reproduction. Scanning unit 207 may send such data to processor 201 which may, in turn, save the data in memory 203. In addition, scanning unit 207 may be configured to scan checks or other non-currency paper items, in addition to paper currency.

Further, recycler 200 may include one or more mechanical or electromechanical systems (not shown) for automatically transferring currency between stackers 217, cartridges 215, input slot 209 and withdrawal slot 211 in recycler 200. For example, currency may automatically be withdrawn from recycling units 217 and directed into cartridge 215A for storage using a series of motorized rollers. In another example, currency stored in cartridge 215A may be withdrawn and organized and stored into recycling units 217 according to denomination. Using such systems to facilitate the automated movement of currency between storage components and other portions of recycler 200 may provide efficiency and security by alleviating some of the need to manually handle currency stored within recycler 200.

Figure 3:
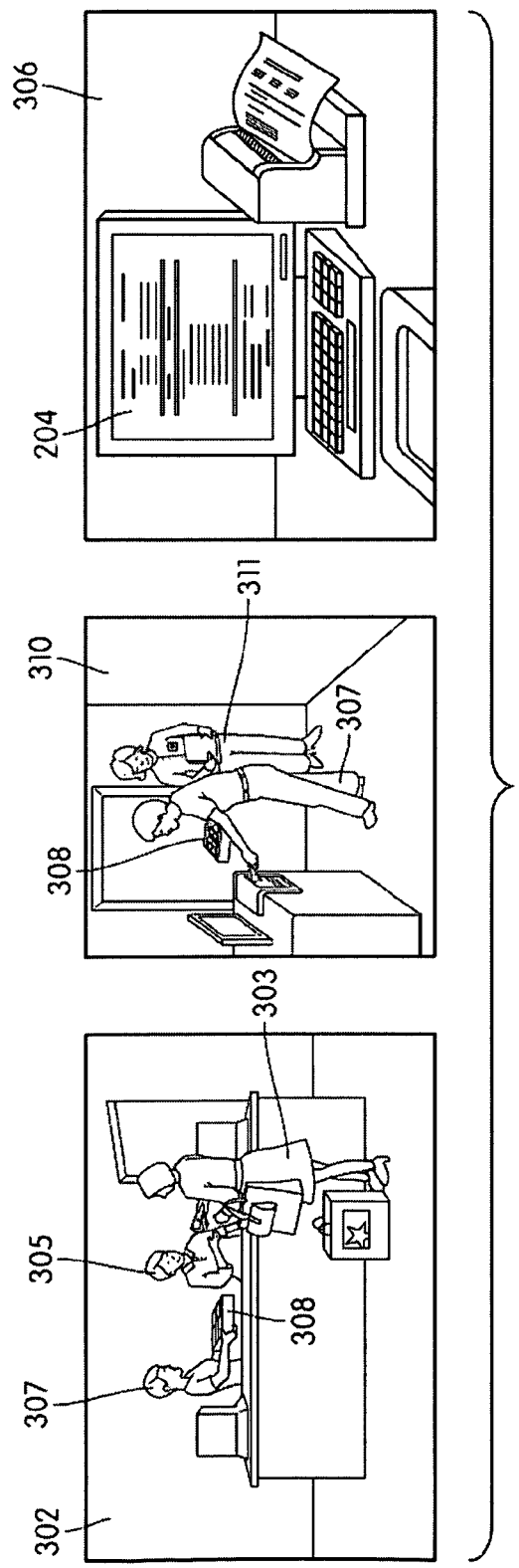
FIG. 3 illustrates various features of a currency recycler that may be used in accordance with aspects of the invention.

FIG. 3 illustrates various features of cash recycler, such as cash recycler 200 of FIG. 2, used in various aspects of the invention. The images in FIG. 3 depict use of a single cash recycler 200 in a retail environment. The retail owner may have a cash recycler 200 located in each of their stores. In an aspect of the invention, summary information for the retail owner's stores may be available via an interface to the financial institution. In another embodiment, access to summary information may be available directly from each of the cash recyclers 200.

In FIG. 3, image 302 depicts customer 303 paying cash to a retail employee such as store cashier 305 for a purchase. Another store cashier 307 at a recently closed cash register may be carrying a cash drawer or till 308 to a back office for reconciliation. In image 310, store cashier 307 may load currency from cash register till 308 into cash recycler 200. In addition, store cashier 307 may also deposit other paper forms of payment received from customer such as checks. An office manager 311 may be supervising cashier 307 during the loading of cash register till 308 into cash recycler 200. Moreover, upon the start of a shift a cashier may fill his/her cash register till with a designated amount of currency dispensed from cash recycler 200.

In image 306 of FIG. 3, a display screen (e.g., display 213 of cash recycler 200 of FIG. 2) may show the total amount entered into cash recycler 200 from till 308. The display screen 213 may breakout the amount entered into cash recycler 200 by denomination and by each cashier. The total amount deposited and withdrawn from cash recycler 200 may be shown on display screen 213.

Figure 4:
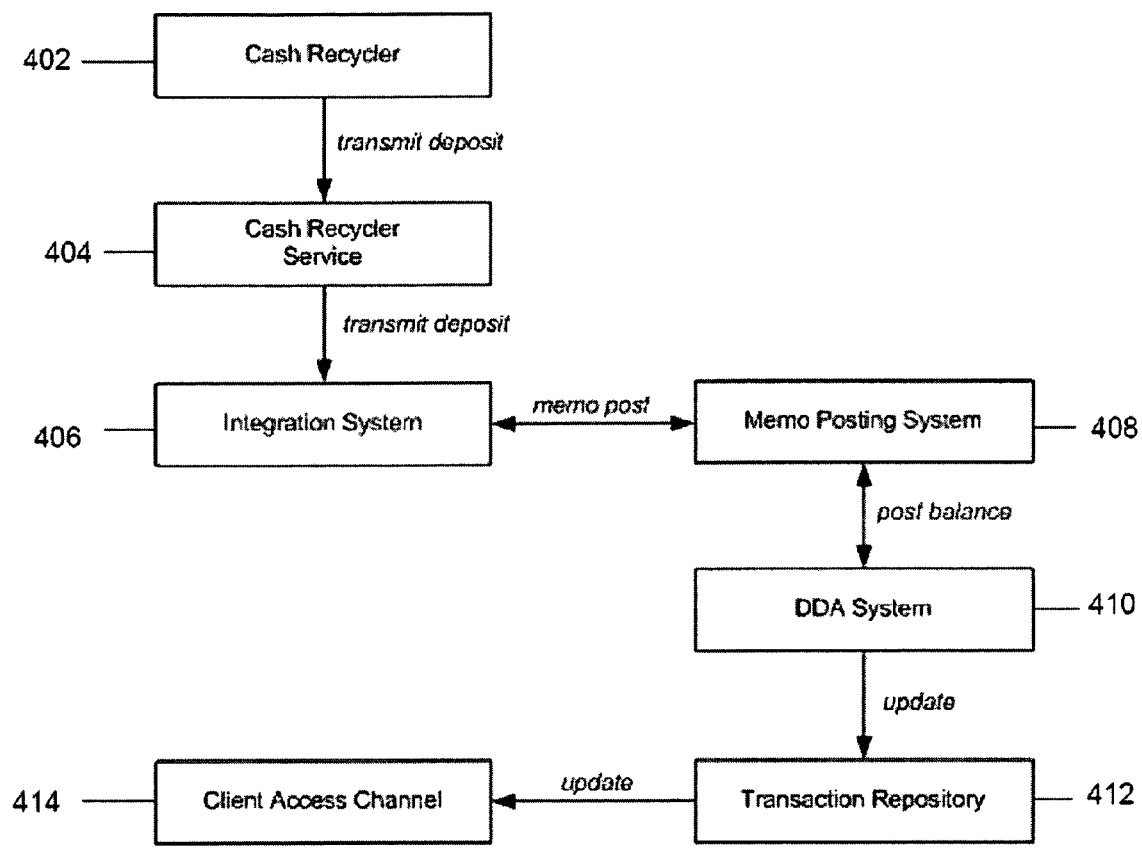
FIG. 4 illustrates a system configuration that may be used in accordance with an aspect of the invention.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location (e.g., a retail store) to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

According to one aspect, cash recyclers such as cash recycler 102 (FIG. 1) and 200 (FIG. 2) and other cash handling devices may facilitate real-time recognition of funds. In particular, funds deposited at a recycler or other cash handling device at a client site may be recognized by a bank at the time the deposit is made. Recognition refers to the real credit (i.e., not provisional) of deposited funds into a client's account. In contrast to current systems, there is no delay between a deposit of funds and when the funds and transaction data are submitted to the bank for recognition. Thus, instead of having to wait until the end of the day or another prescheduled time for deposits and/or withdrawals to be recognized by the bank, each deposit is processed for recognition in real-time. Data regarding the withdrawal or deposit transaction may be transmitted through a data network to the bank for recognition and processing. Providing real-time recognition offers may advantages including the ability for a client to withdraw the same currency that was earlier deposited for use in the client's operations, all at the client site and without having to first transport the deposited funds to the bank for recognition. Currency recyclers, recycling management and recognition of funds are further described in U.S. application Ser. No. 11/614,656, entitled "Commercial Currency Handling and Servicing Management," filed on Dec. 21, 2006, the content of which is incorporated herein by reference in its entirety.

Figure 5:
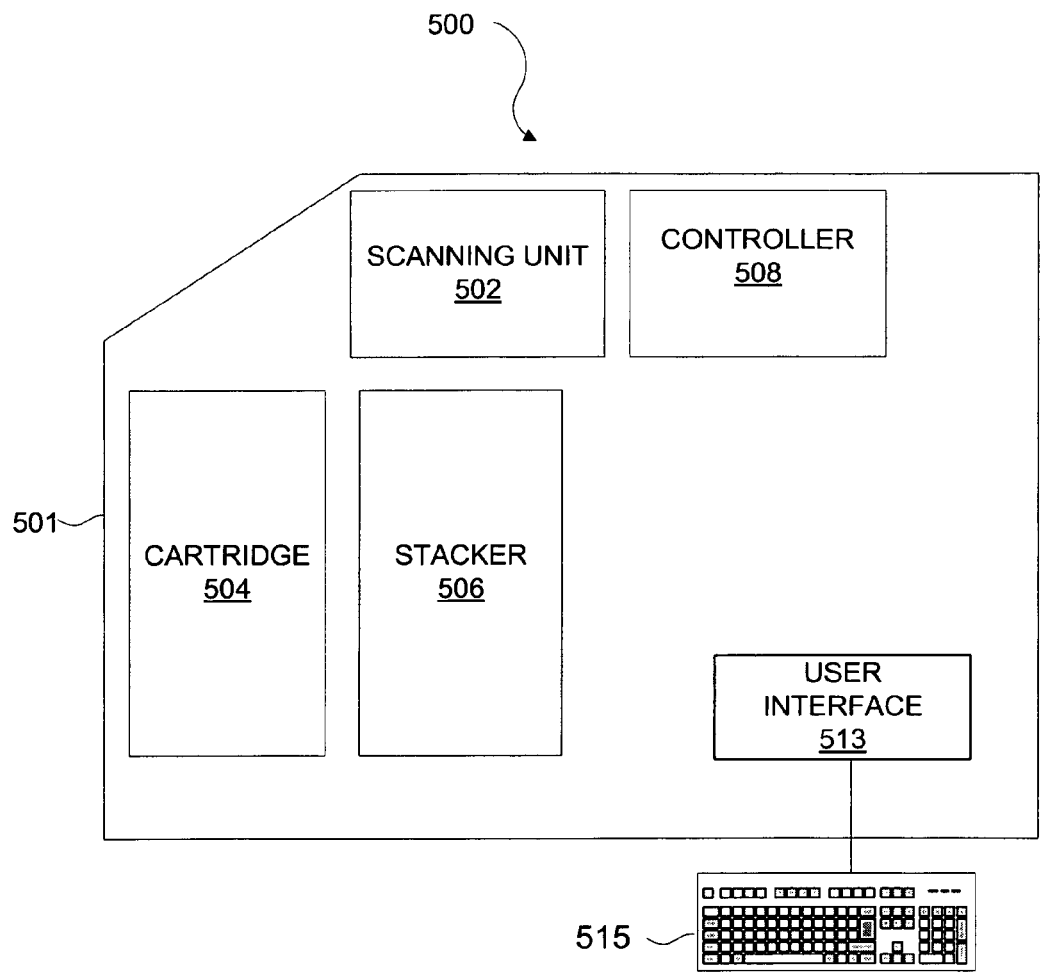
FIG. 5 is a simplified diagram of a currency recycler including various components used in accordance with one or more aspects described herein.

FIG. 5 illustrates one example cash recycler 500 having various components to simplify performance of the cash recycler 500 and improve efficiency of the cash recycler 500.

With further reference to FIG. 5, the cash recycler 500 or other currency handling device described above may include a controller 508. The cash recycler 500 may include some or all aspects of the cash recycler 200, as shown in FIG. 2. The controller is configured to control the operations of cash recycler 500, including processing transactions including transmitting data to a financial institution for recognition at the financial institution, controlling mechanical systems of the cash recycler 500, controlling access to one or more portions of recycler 500, reconciling logical and physical counts and the like. As shown in FIGS. 5 and 6, the controller 508 may be physically located within the housing of the cash recycler, e.g., as part of a cash recycler housing 501, or as a separate component. The controller 508 generally includes a processor 602. Controller 508 may further include memory such as RAM 606 and ROM 604. In addition, the controller may include or have access to storage 608 and a user interface 610. The user interface 610 may include a display as well as various input devices such as a keyboard 612, mouse, and the like. In some arrangements, the display may be a touch-sensitive display thereby allowing user input to be received through the display. Additionally or alternatively, the user interface may be configured to receive voice commands. The controller may further be configured to control various peripheral devices, such as a printer, external storage device, and the like using one or more adapters and interfaces (not shown).

The controller 508 is configured to execute software for providing functionality to the cash recycler 500. For instance, the controller 508 executes commands as directed by the software to control transactions made using the currency recycler 500, communicate with the financial institution or other entity, provide outputs via the user interface 610 or a peripheral device, such as a printer, and also to physically move the currency within the cash recycler 500. In addition, the controller 508 may be configured to execute software to determine the amount of cash in a cash recycler or cash drawer being deposited into the cash recycler and/or determine the amount of cash in a separate storage and cash disbursement component, as will be described more fully below.

For example, a user may deposit $1000 into the cash recycler 500. The user provides input through the user interface 610 regarding the deposit. This user input may include selection from a display, voice commands, and the like. The money is then deposited into the cash recycler 500. In one arrangement, the controller 508, in response to various instructions provided by the software, may control the mechanical systems of the cash recycler 500, as well as the electronic (e.g., computer) systems of the cash recycler 500. For instance, the controller 508 may operate the mechanical system that controls the flow of currency into the machine during a deposit. In another arrangement, the controller 508 may house the software configured to send and receive instructions to an additional driver or controller that controls the flow of currency. These mechanical systems are not shown in the figures but are indicated by arrows 503. In addition, the controller 508 controls the scanning device 502 to scan each bill inserted into the cash recycler 500 to confirm authenticity and to verify the condition of the bill. If a bill is deemed to be an unauthorized reproduction it will be removed from circulation and stored in a separate region of the cash recycler 500. The controller 508 will engage various mechanical systems to store the bill in the separate region. If the bill is deemed too worn to be returned to circulation, the mechanical systems run by the controller 508 will remove the bill and place it in a separate region for storage. If the bill is deemed suitable to return to circulation it will remain with the bills in the recycler 500 that may be withdrawn from the recycler 500. Further, controller 508 may reconcile a deposit amount specified by a depositing user and a physical count of the currency actually deposited to insure accuracy and integrity. In addition, the controller 508 will store data related to the amount of currency inserted into the cash recycler 500, as well as the amount of currency removed from circulation for various reasons. In still other examples, the controller 508 may aid in transmitting the cash transaction information to the financial institution. Additionally or alternatively, the controller 508 may forward a communication, such as an email, to an email box reporting the cash transaction. In still other arrangements, the controller 508 may forward a report of the cash transaction to a peripheral device, such as a printer, to print the report as a record of the cash transaction.

In some arrangements, the cash recycler 500 may be a hardened device. That is, the cash recycler 500, along with controller 508, may be constructed in a secure manner such that cash recycler 500 and controller 508 might not be easily reconfigured. For example, a controller such as controller 508 may be integrated into cash recycler 500 using application specific circuits, dedicated hardware connections and components and the like that might not be easily disrupted or reconfigured. This may prevent intruders from accessing the cash recycler system without authorization by, e.g., merely disconnecting an external controller.

Additionally or alternatively, access to the various functions of the cash recycler 500 may be password protected or may require other authorization and authentication before a user may perform or adjust those functions. In one arrangement, biometric data, such as fingerprint, iris scan, and the like, may be used to authenticate a user of the cash recycler 500 to permit adjustment to various settings. In addition, access to the internal portion of the cash recycler 500 may be restricted to only authorized users. The cash recycler 500 may include one or more locks to prevent unauthorized access to the internal portion of the cash recycler 500. Integrating the controller 508 within the cash recycler 500 provides such additional security to prevent unauthorized access to the computer systems and internal portion of the cash recycler 500 and reduces the ability of would-be intruders to access the controller 508 without authorization and bypass such security measures.

Figure 6A:
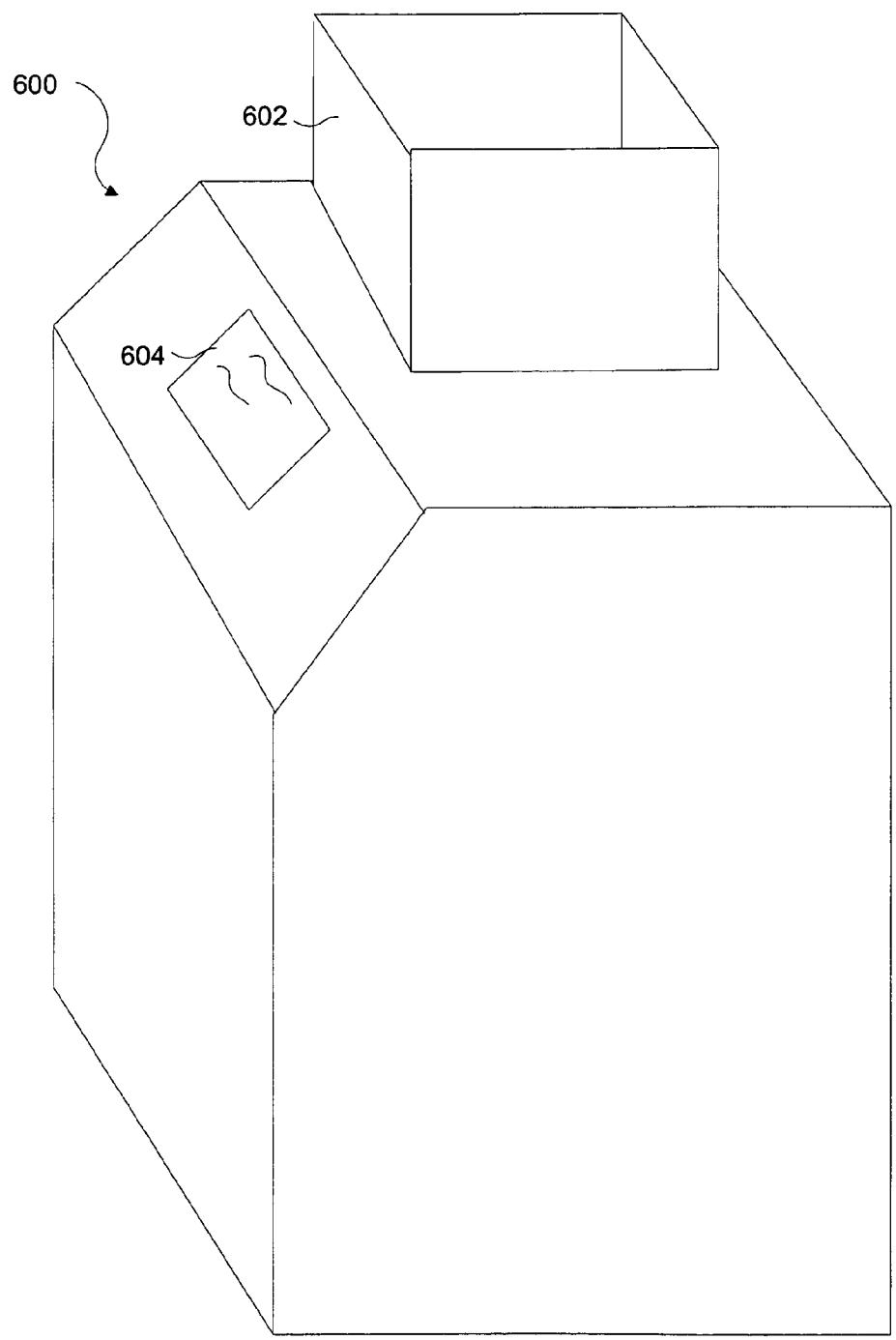
FIG. 6A illustrates an example cash handling device with a flexible capacity module in accordance with aspects described herein.

FIG. 6A depicts an alternate arrangement of a cash handling device, similar to the device discussed above. In addition to the features of the cash handling device described above, the cash handling device 600 may also include an additional cash storage, depositing and/or dispensing component, such as flexible capacity module 602. In some arrangement, the flexible capacity module may be an open tray, such as shown in FIG. 6, where bills may be removed from a traditional safe and placed into the tray. Accordingly, security concerns may be minimized. In other arrangements, the flexible capacity module may be an enclosed box-type module.

Figure 6B:
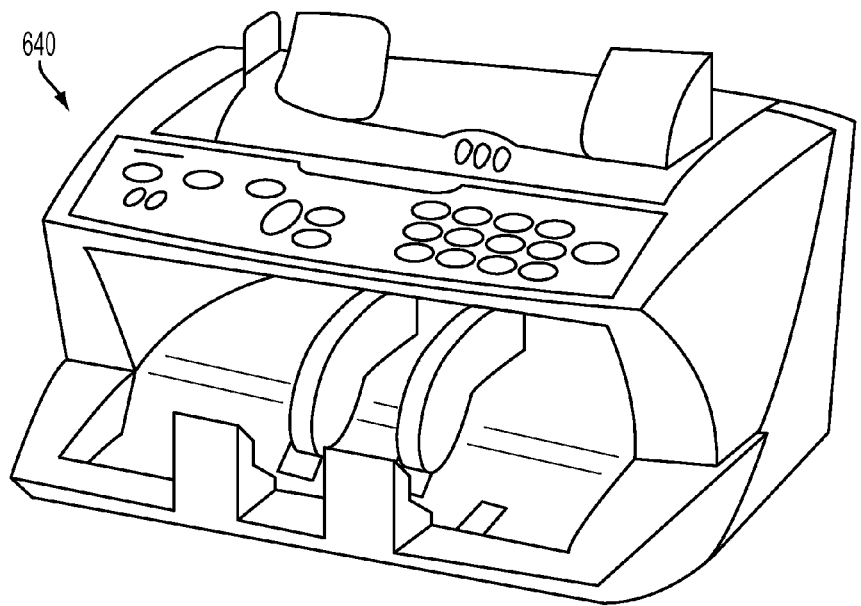
FIGS. 6B and 6C illustrate example flexible capacity modules in accordance with aspects described herein.

FIG. 6B illustrates one example flexible capacity module 640 that may be used in accordance with aspects described herein. FIG. 6B depicts a currency counter/discriminator 640. In some arrangements, the currency counter 640 may be preconfigured to count out a predetermined number of bills or amount and pause at the predetermined dollar amount or bill count. Accordingly, all one dollar bills may be maintained or counted out from a currency counter such as counter 640.

Figure 6C:
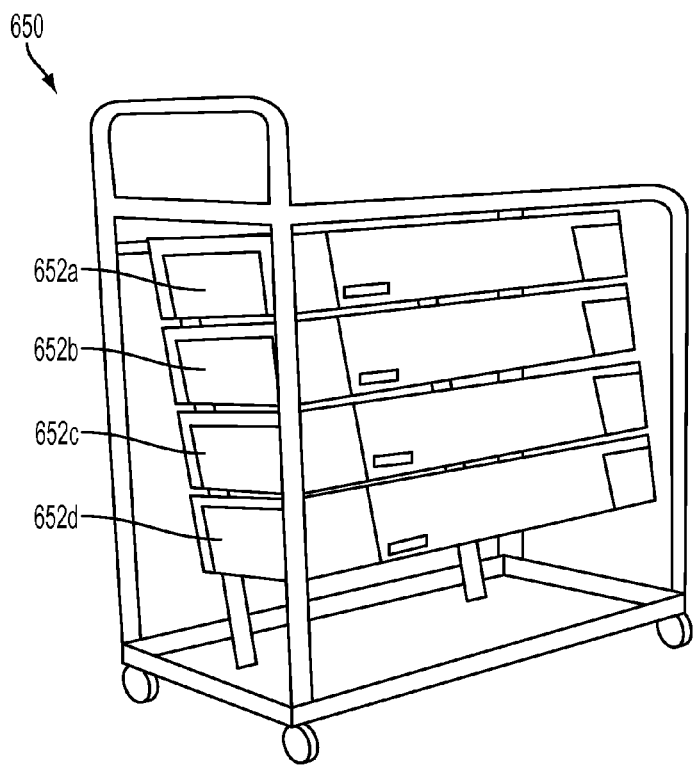

FIG. 6C illustrates another example flexible capacity module 650 that may be used in accordance with aspects described herein. The module 650 includes a plurality of trays 652. In some arrangements, one of the trays 652 (i.e., 652a) may be configured to contain the one dollar bills that would then be counted out as needed to fill various cash drawers or tills. The tray 652 may generally be configured to collect currency, dispense currency, and/or store currency.

The flexible capacity module 602 may be used to provide additional flexibility to the capacity of the cash handling device in that one or more denominations of bills may be stored in the module 602, thereby freeing up additional capacity in the cash handling device. In some arrangements, the flexible capacity module 602 is a separate component without physical connection to the cash handling device 600. However, the flexible capacity module 602 in these arrangements would be wired to the cash handling device 600 to permit the two devices to work in conjunction with each other. In other arrangements, the module 602 may be connected to the cash handling device 600 and/or may be located close by or adjacent to the cash handling device 600. For instance, the flexible capacity module 602 may be located on top of the cash handling device 600 and/or the storage module may be an integrated cash discriminator, sorter and/or counter.

In one arrangement, the flexible capacity module 602 may be used for the storage, dispensing and/or collecting of one dollar bills. In several retail establishments, such as those having one or more cash handling devices on site, the retail store may output more one dollar bills than it takes in. That is, the store needs a large supply of one dollar bills in order to conduct business. Rather than using the capacity of the cash handling device to store this large number of one dollar bills, and instead of incurring the substantial cost of an additional cash handling device to handle the large volume of one dollar bills, the additional flexible capacity module 602 may be used to handle the large volume of one dollar bills and, in some arrangements, all one dollar bills may be stored, deposited into and/or dispensed from the flexible capacity module 602. In some arrangements, the bills may not be stored in the module 602, but rather may be loaded into the module 602 prior to dispensing in order to be counted and dispensed as desired.

In some arrangements, the bills in the flexible capacity module 602 may not be considered part of the inventory of the cash handling device 600. That is, the bills output or taken into the flexible capacity module 602 may be separate funds that are not credited to an account of a user, retail store, and the like held at a financial institution. For instance, the data associated with the one dollar bills may be integrated but not necessarily stored on the recycling unit. The data associated with all bills, including those in both the recycling unit and flexible capacity module 602 may be stored, in some arrangements, for audit purposes, and the like. However, credit for only some of the bills, i.e., bills in the cash handling device and not those in the flexible capacity module, would be given at the financial institution. The data may be stored, for instance, on the cash handling device. In some arrangements, the data associated with the one dollar bills may be integrated via a cash discriminator, counter, sorter, and the like. The data may be sent to a controller along with the data associated with the bills of other recognized denominations and stored in the cash handling device. The count data for bills in the flexible capacity module may be integrated with the data from the cash recycler to permit reports to be generated, balancing, reconciliation, and the like. However, the data for the bills in the flexible capacity module may be separate and not credited or debited to an account at the financial institution.

With reference to the above example, although some liquidity of cash may be lost by removing the one dollar bills from the cash recycler and not crediting or debiting them to the user's financial institution account, this arrangement provides an efficiency gain because the one dollar bills may be processed in parallel by the flexible capacity module while the cash handling device is processing bills of other denominations. In general lower denominations such as one dollar bills represent a large portion of the processed bill volume but a relatively small portion of the total cash amount in use at a retail location. It is desirable to provide an automated way to count the lower denominations, but relatively little is lost in terms of liquidity if the smaller denominations are not stored within the cash handling device and credited to the client account. Therefore, it is beneficial to reserve recycler storage space for the larger denominations so retail establishments can maximize the dollar amount that is credited to their account. Further, the flexible capacity module 602 provides a lower cost alternative to additional capacity without the higher cost of additional cash handling devices. Yet another advantage is that, by removing the one dollar bills from the cash handling device, there may be less downtime associated with the jams, malfunctions, and the like of the cash handling device. For instance, one dollar bills tend to, in general, be lower quality bills than for instance a twenty dollar bill, fifty dollar bill, and the like. Accordingly, these lower quality bills may cause more paper jams, malfunctions, and the like that lead to downtime, service calls, and the like, than higher quality bills. Removing the one dollar bills from the cash handling device thereby removes one potential cause of these types of service issues.

Additionally or alternatively, processing the one dollar bills in the cash handling device then storing them in the flexible capacity module may provide faster and/or simpler processing of the one dollar bills. For instance, the one dollar bills may be processed along a smaller portion of the bill path than other bills stored in the cash recycler, thereby reducing the possibility of malfunctions, jams, and the like due to movement of the bills along those portions of the bill path. In addition, the flexible capacity module may include a simplified transport system and may operate without a bill validator, in order to reduce costs associated with the flexible capacity module. In some arrangements such as these, the bills may be validated at the cash handling device. In still other arrangements, one dollar bills may be processed in a manner substantially similar to all other bill denominations, except that the bills will be stored in (in the case of deposits) or withdrawn from (in the case of withdrawals) the flexible capacity storage module, rather than the cash handling device.

Upon depositing the bills designated for the flexible capacity module 602, the bills may be, in some arrangements, placed in the cash handling device for counting purposes and/or to verify the quality, denomination, and the like of the bill. In these instances, the bills will be rejected from being stored in the cash handling device because, since they are stored in the flexible capacity module, there is no designated cartridge, rolled storage module, and the like for this denomination of bills. The bills would then be transferred to the flexible capacity module 602 for storage and dispensing as needed.

Additionally or alternatively, the bills may be deposited directed into the flexible capacity module 602 for any of counting, bill verification, quality verification, and the like. For instance, the flexible capacity module 602 may include a discriminator or sorter for counting the bills. In addition, the flexible capacity module may include a cartridge, stacker or other mobile dispensing option that may be in communication with the cash handling device.

In arrangements in which a discriminator or counter is used to count and handle the one dollar bills, then any bills rejected from the cash handling device will include only denominations other than one dollar bills, for instance, because the one dollar bills are processed separately from all other denominations. Those rejected bills may be manually entered in as "reject" dollar amounts for balancing and/or reconciliation purposes.

Additionally or alternatively, if the cash handling device is used to count and validate one dollar bills as well as other denominations, i.e., the one dollar bills are inserted into the cash handling device for count, verification, and the like, as described above, then all one dollar bills will be rejected, along with various bills of other denominations. The one dollar bills will be rejected because there is no designated storage area in the cash handling device for that denomination. In these arrangements, some or most of the one dollar bills will be validated and counted prior to being rejected, however some will be rejected prior to being counted and validated because they may be unreadable due to poor quality, and the like. As such, the validated one dollar bills would be routed to a flexible capacity module, such as an output tray, sectioned output tray, designated storage device that is docked to or otherwise associated with the cash handling device, and the like. The value of the validated bills that have been routed would be automatically stored in an "other category" of cash associated with the cash handling device (such as column 714 in FIG. 7) for balancing and/or reconciliation purposes. The rejected one dollar bills, i.e., those rejected for poor quality, and the like and not validated, would route to a designated reject bill area along with other reject bills of various denominations (i.e., all bills not validated and/or counted). The value of the bills in this area (including nonvalidated, rejected one dollar bills and bills of other denominations) may then be entered (i.e., manually or automatically) for balancing and/or reconciliation purposes.

In some arrangements, the flexible capacity module 602 may include an aperture (not shown) into which a cash drawer or till may be inserted in order to deposit and/or dispense bills from the module 602. In other arrangements, the flexible capacity module 602 may include a tray (not shown) that may be transferred from the module 602 to the cash handling device 600 in order to deposit or dispense the bills from the module 602 from/to the cash drawer or till. In still other arrangements, the flexible capacity module 602 may be a secure storage box into which one dollar bills are loaded, either manually or automatically. In still further arrangements, the tray may be an open tray that is loaded, either automatically or manually, with funds from a traditional safe. In one alternate arrangement, the funds may be stored in the tray in the safe and "docked" or otherwise associated with the cash handling device for processing. In some arrangements, the bills may be inserted into the cash handling device during deposit and rejected. The currency may then be counted and the count data recorded for reconciliation purposes. However, the bills are not stored in the cash handling device, nor is the amount credited or debited to a user financial account.

Additionally or alternatively, the cash handling device 600 and/or flexible capacity module 602 may include a user interface, such as user interface 604. The user interface may be used to configure various aspects of the cash handling device 600 and/or flexible capacity module 602, as will be discussed below.

In some arrangements, funds being transported to the cash handling device 600 and/or flexible capacity module 602 may be transported in a single cash bag or other cash transport mechanism. For instance, replenishment of a cash handling device 600 may include replenishment of bills stored in the flexible capacity module 602. In these arrangements, all denominations may be transported in a single cash bag and the denominations may be separated upon receipt at the devices. In other arrangements, the denominations may be transported in separate cash bags based on the destination (i.e., cash handling device 600, flexible capacity module 602, and the like) of the bills.

FIG. 7 illustrates one example user interface associated with the use of a flexible capacity module with a cash handling device. As discussed above, the data associated with bills in the flexible capacity module may be integrated with data from the cash handling device in that it may be stored in the same hardware unit, may be available to the retail store, financial institution, and the like, however, the data will be separate from the data associated with the funds in the cash handling device. As shown in FIG. 7, the contents of various cash drawers or tills may be deposited into the cash handling device and flexible capacity module for reconciliation, and the like. The various cash drawers are shown in column 702. The status of each cash drawer is shown in column 704. For instance, if the drawer is still in use, the status may be shown as open, as in field 704a, while drawers that are no longer in use may include a closed indication, as in field 704B. Column 706 provides a running balance associated with that particular cash drawer. The running balance includes any recycler activity shown in column 708, any rejected notes, as in column 710, any coin in that particular drawer, as in column 712, as well as any other activity as in column 714. The other activity may include funds located in the flexible capacity module. That is, those funds would be part of the overall count associated with a particular drawer in order to properly reconcile the drawer, however, they would not be considered part of the recycler activity which may be recognized in real time at the financial institution. The fields shown in user interface 700 may be automatically populated as cash drawers are returned to the cash handling device and flexible capacity module for deposit or as funds are dispensed to make up cash drawers.

FIG. 7 also includes a print button 716 that allows a user to print the screen. In some arrangements, other reports, screens, and the like may also be printed from the user interface. In addition, the user interface 700 includes a back button 718 to return a user to a previous screen.

Figure 8:
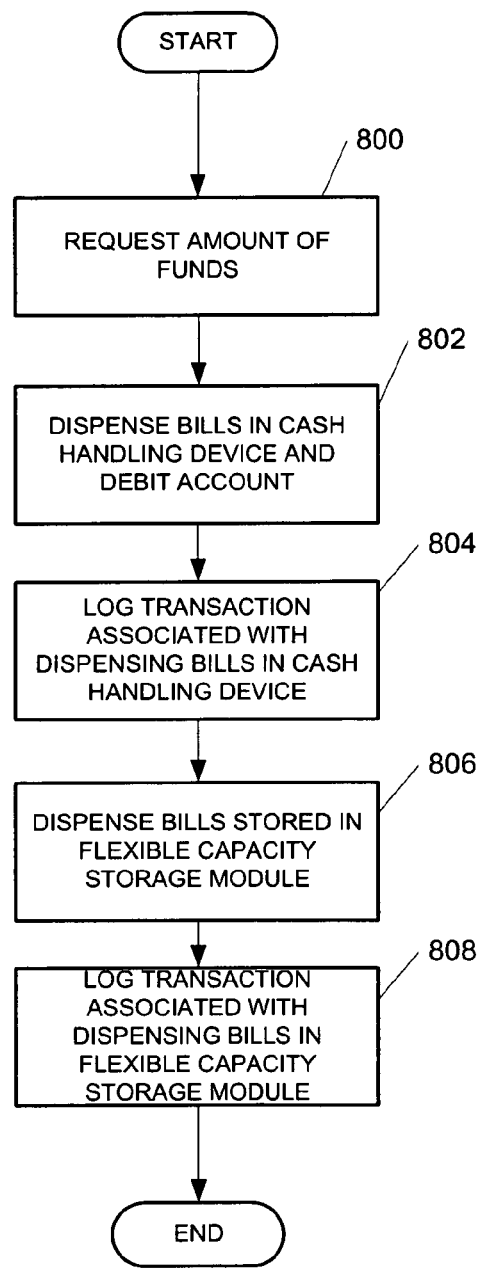
FIG. 8 illustrates one example method for filling tills or cash drawers from a cash handling device and flexible capacity module in accordance with aspects described herein.

FIG. 8 illustrates one example method of filling a cash drawer or till from a cash handling device and flexible capacity module. In step 800 an amount of funds is requested. The request may be for a predefined till amount, such as a predetermined number of bills of various denominations, or the user may specifically request an amount including selecting the number of bills of each desired denomination. In step 802, the selected or predetermined number of bills of denominations stored in the cash handling device are dispensed and the client's account at the financial institution is debited. For instance, if all denominations are stored in the cash handling device except one dollar bills, the desired bills of all denominations except one dollar bills will be dispensed. This transaction may also be logged at the financial institution and/or on software resident on the cash handling device or associated central server for balancing/reconciliation purposes, as shown in step 804.

In step 806, the denominations not stored in the cash handling device are dispensed. For instance, if the one dollar bills are not stored in the cash handling device, the one dollar bills are dispensed in this step, from the separate storage device, such as the flexible capacity module. The flexible capacity module may be, for instance, a discriminator/sorter, cassette, stacker or other such mobile dispensing option that may or may not be laid onto the cash handling device, or a large holding bin on the top of or nearby the cash handling device for the specific purpose of counting and/or storing the denomination not stored in the cash handling device, i.e., the one dollar bills. In step 808, the dispensing or other activity associated with the denomination not stored in the cash handling device, i.e., the one dollar bills, is logged by the software resident on the cash handling device, or associated central server, for balancing/reconciliation purposes. However, this activity is not reported to the client's account at the financial institution because this denomination is not considered part of the inventory of the cash handling device. In some arrangements, this method may include a user logging in to the cash handling device prior to requesting funds and/or the user logging out at the completion of the transaction.

Figure 9:
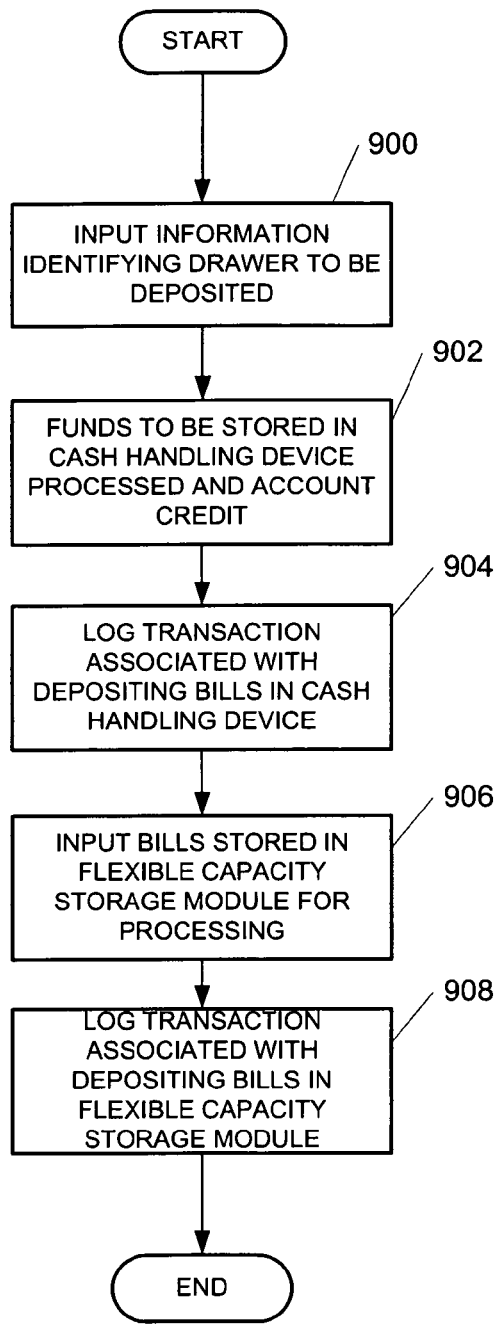
FIG. 9 illustrates one example method of depositing tills or cash drawers into a cash handling device and flexible capacity module in accordance with aspects described herein.

FIG. 9 illustrates one example method of depositing cash from one or more cash drawers or tills into the cash handling device and/or flexible capacity module. In step 900, information identifying a particular cash drawer being deposited or a particular employee performing the deposit transaction may be input. In step 902, funds being processed by the cash handling device, such as funds being stored in the cash handling device and, in some instances, those withdrawn from a cash drawer, are input into the cash handling device for processing. The client's account at the financial institution may be credited with the funds deposited in this step. In step 904, this transaction is logged by the financial institution and/or the software resident on the cash handling device or central server associated with the device. In step 906, the funds not stored in the cash handling device, i.e., the one dollar bills, are inserted for processing. In some arrangements, the one dollar bills may be inserted into the cash handling device for counting and bill verification, quality verification, and the like. In these arrangements, the one dollar bills may be verified and rejected by the cash handling device for storage elsewhere, i.e., in the flexible capacity module. In other arrangements, the one dollar bills may be verified by the cash handling device and routed to the flexible capacity module for storage. In other arrangements, the one dollar bills may be directly inserted into the flexible capacity module for processing. The module may be a discriminator/sorter, a cassette, stacker or other such mobile dispensing option that may or may not be connected to or laid onto the cash handling device, or a holding bin on top of or nearby the cash handling device for the purpose of counting and/or storing the denomination not stored in the cash handling device, i.e., the one dollar bills.

In step 908, this activity is logged by the software resident on the cash handling device or central server associated with the device for balancing or reconciliation purposes. In some arrangements, this activity is not reported to the financial institution or client's account because this denomination is not considered part of the inventory of the cash handling device.

Figure 10:
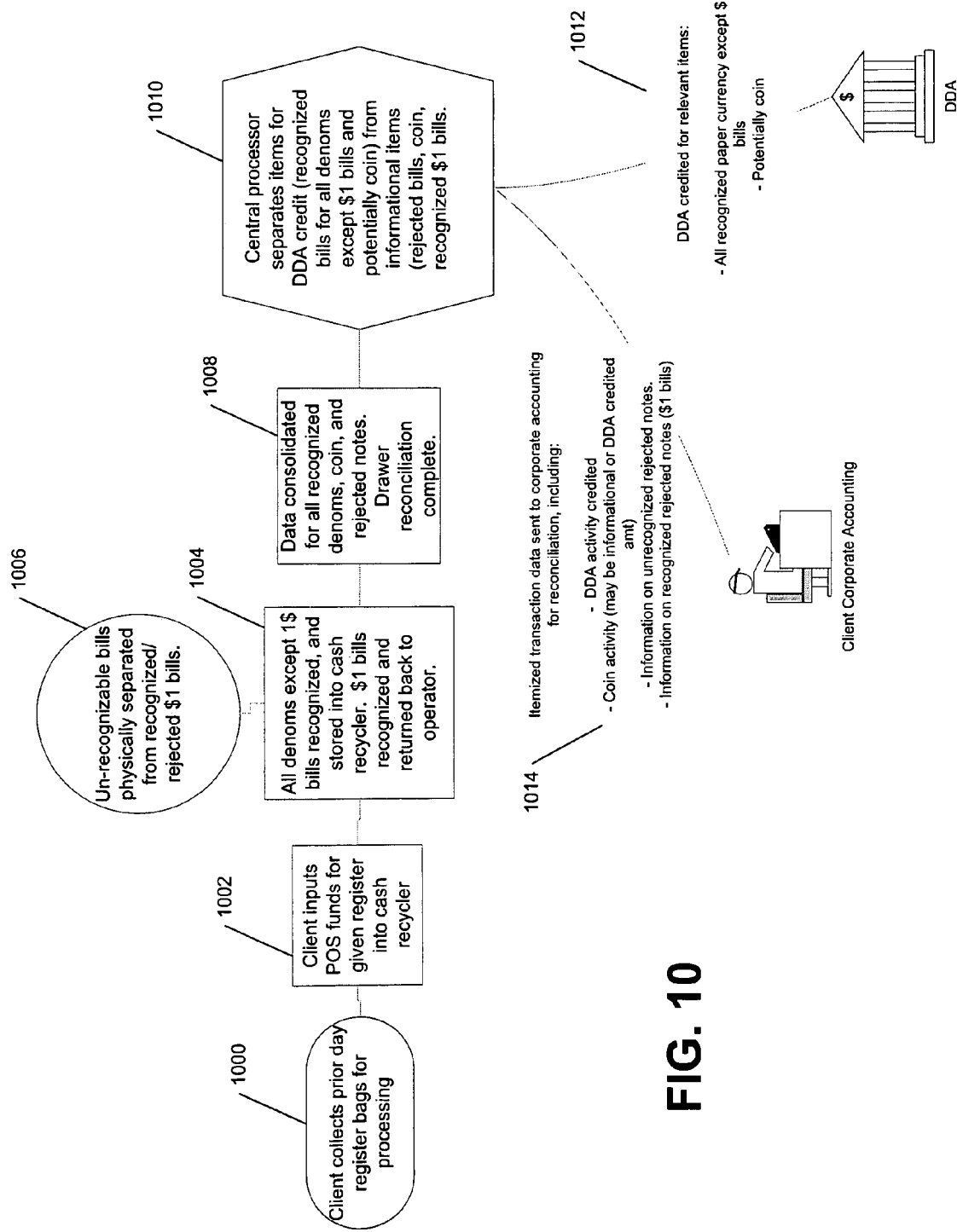
FIG. 10 illustrates another example method of depositing tills or cash drawers into a cash handling device and flexible capacity module in accordance with aspects described herein.

FIG. 10 illustrates a more detailed example method of depositing the contents of one or more cash drawers or tills into the cash handling device and/or flexible capacity module. In step 1000, funds associated with cash drawers or tills are collected for processing. In step 1002, a user may input the funds into the cash recycler. In step 1004, all denominations except one dollar bills are recognized and stored in the cash recycler. The one dollar bills are recognized and returned back to the operator or, in some arrangements, routed to the flexible capacity module for storage. In step 1006, any unrecognized one dollar bills are physically separated from the recognized/rejected one dollar bills. In step 1008, data is consolidated for all recognized denominations, coin and rejected notes. The drawer reconciliation is now complete. In step 1010, a central processor separates items to be credited to the client's financial account (i.e., recognized bills for all denominations except one dollar bills and potentially coin) from information items (i.e., rejected bills, coin, recognized one dollar bills). In step 1012, the client account is credited for all recognized paper currency except one dollar bills and, in some arrangements, coin. In step 1014, itemized transaction data is transmitted to a central server, such as a corporate accounting department at the retail store, for reconciliation, including: credit to the client financial account, coin activity (may be information, i.e., not credited to the financial account, or credited to the financial account), information regarding unrecognized rejected notes, and/or information regarding recognized rejected notes, i.e., one dollar bills.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method of transferring cash from a cash drawer, comprising:
   receiving bills of a first denomination from the cash drawer at a currency recycler;
   storing data related to an amount associated with the bills of the first denomination at the currency recycler;
   storing the bills of the first denomination in the currency recycler;
   receiving bills of a second denomination from the cash drawer at the currency recycler, wherein the bills of the second denomination comprise one-dollar bills;
   responsive to receiving the bills of the second denomination at the currency recycler:
      counting the bills of the second denomination at the currency recycler;
      rejecting the bills of the second denomination at the currency recycler; and
      transferring the bills of the second denomination from the currency recycler to a flexible capacity storage module configured to accept and dispense cash, wherein the flexible capacity storage module is a device separate from and adjacent to the currency recycler, and wherein the flexible capacity module includes a simplified transport system and a plurality of trays configured to collect, dispense, and store the bills of the second denomination;
   storing data related to an amount associated with the bills of the second denomination at the currency recycler; and
   storing the bills of the second denomination in the flexible capacity storage module,
   wherein the currency recycler is configured to cause the amount associated with the bills of the first denomination to be credited to an account at a financial institution while not crediting the account with the amount associated with the bills of the second denomination.

2. The method of claim 1, further comprising:
   receiving bills of a third denomination from the cash drawer at the currency recycler, the third denomination being different from the first denomination and the second denomination; and
   storing the bills of the third denomination in the currency recycler.

3. The method of claim 2, wherein the currency recycler is further configured to cause an amount associated with the bills of the third denomination to be credited to the account at the financial institution.

4. The method of claim 1, wherein the flexible capacity storage module is located on top of the currency recycler.

5. The method of claim 1, wherein the flexible capacity storage module comprises an integrated cash discriminator, sorter, and counter.

6. The method of claim 1, wherein the amount associated with the bills of the first denomination is recognized by the financial institution and can be withdrawn before the stored bills of the first denomination are transported to the financial institution.

7. The method of claim 1, wherein the currency recycler is configured to generate at least one report based on the stored data related to the amount associated with the bills of the second denomination.

8. The method of claim 1, wherein the bills of the second denomination are rejected based on the currency recycler being configured to store currency of the second denomination in the flexible capacity storage module instead of the in the currency recycler.

* * * * *